United States Patent [19]

Nishino et al.

[11] Patent Number: 4,556,547

[45] Date of Patent: Dec. 3, 1985

[54] PROCESS FOR TREATMENT OF GASES

[75] Inventors: Hiroshi Nishino, Suita; Toshio Aibe; Katsuya Noguchi, both of Toyonaka, all of Japan

[73] Assignee: Takeda Chemical Industries, Ltd., Osaka, Japan

[21] Appl. No.: 460,045

[22] Filed: Jan. 21, 1983

[30] Foreign Application Priority Data

Feb. 1, 1982 [JP] Japan .................................. 57-15422
Mar. 9, 1982 [JP] Japan .................................. 57-37500
Mar. 9, 1982 [JP] Japan .................................. 57-37501

[51] Int. Cl.$^4$ ............................................ B01D 53/34
[52] U.S. Cl. .................................... 423/230; 423/231; 423/232; 423/234
[58] Field of Search ............... 423/220, 230, 232, 234, 423/244, 567, 573 R, 244 R, 231; 55/73; 502/183, 184, 417

[56] References Cited

U.S. PATENT DOCUMENTS

| | | | |
|---|---|---|---|
| 1,812,526 | 6/1931 | Gross et al. ......................... | 423/220 |
| 2,513,508 | 7/1950 | Morrell et al. ...................... | 502/417 |
| 2,528,517 | 11/1950 | Hormats .............................. | 502/417 |
| 3,416,293 | 12/1968 | Alexander ............................ | 55/73 |
| 3,974,256 | 3/1976 | Wheelock et al. ................... | 423/230 |
| 4,002,720 | 1/1977 | Wheelock et al. ................... | 423/230 |
| 4,044,114 | 8/1977 | Dezael et al. ..................... | 423/574 R |
| 4,088,736 | 5/1978 | Courty et al. ....................... | 423/230 |
| 4,233,175 | 3/1980 | Delmon et al. ...................... | 252/192 |
| 4,242,226 | 12/1980 | Siren ................................. | 55/74 |
| 4,310,497 | 1/1982 | Deschamps et al. ............... | 423/230 |
| 4,358,427 | 11/1982 | Urban ................................. | 423/230 |
| 4,399,112 | 8/1983 | Voirin ................................. | 204/230 |
| 4,451,442 | 5/1984 | Jeffrey et al. ....................... | 423/224 |

FOREIGN PATENT DOCUMENTS 362552 12/1931 United Kingdom.
370978 4/1932 United Kingdom.
1260030 1/1972 United Kingdom.

OTHER PUBLICATIONS

*Chemical Engineering Process*, (vol. 70, No. 5), p. 66, May 1974.

*Primary Examiner*—John Doll
*Assistant Examiner*—Jeffrey E. Russel
*Attorney, Agent, or Firm*—Wenderoth, Lind & Ponack

[57] ABSTRACT

Hydrogen sulfide and/or carbonyl sulfide in a gas which does not substantially contain oxygen can easily be removed from the gas by contacting the gas with an activated carbon containing (1) a copper compound and (2) an alkali metal compound and/or alkaline earth metal compound at a temperature of not higher than 150° C.

10 Claims, No Drawings

PROCESS FOR TREATMENT OF GASES

This invention relates to a process for treatment of gases, which is useful for removal of hydrogen sulfide and carbonyl sulfide in from inert or reducing gases.

Sulfur comounds such as hydrogen sulfide and carbonyl sulfide are contained in carbon dioxide gas for beverages, coke furnace gas, blast furnace gas, converter gas, thermal cracking gas of petroleum fractions, natural gas, etc. Since these sulfur compounds, even in trace amounts, present characteristic bad smell andcan produce catalyst poisoning effect, they often give rise to various problems such as in carbonation of beverage mixtures and chemical reactions.

In order to remove these sulfur compounds, there have been proposed processes comprising washing with chemical solutions such as alkali solutions and alkanolamine solutions, removal processes by adsorption utilizing iron oxides, zinc oxide, activated carbon, etc. and the like. However, these processes exhibit inferior removal efficiency and encounter difficulties particularly in the removal of carbonyl sulfide.

The present inventors, in view of such circumstances, conducted extensive investigation, and as a result, found that incorporation into activated carbon of a copper compound, and an alkali metal compound and/or an alkaline earth metal compound led to highly efficient removal of hydrogen sulfide and carbonyl sulfide in gases. This finding has culminated in the completion of this invention.

Thus, this invention is concerned with a process for treatment of a gas containing hydrogen sulfide and/or carbonyl sulfide (hereinafter referred to as "sulfur compounds") but not substantially containing oxygen, which comprises contacting the gas with activated carbon (hereinafter referred to as "activated carbon containing metal compound") containing (1) a copper compound and (2) an alkali metal compound and/or an alkaline earth metal compound (alkali metal compound and/or alkaline earth metal compound are collectively or independently referred to hereinafter as "second metal compound") at a temperature of not higher than 150° C., whereby sulfur compounds are removed from the gas.

The activated carbon, which is useful in this invention, may be any activated carbon which is manufactured by known processes utilizing coal, coke, charcoal, coconut shells, resins, etc. as raw material and shows a specific surface area of 200 to 2000 m$^2$/g. The activated carbon is used in a suitable shape, which varies with the intended process for treatment of gases, such as spherical beads, cylindrical pellets, crushed pieces, powder and treadlike pieces.

Examples of the copper compounds used in the present invention include oxides, hydroxides, and salts with inorganic acids (such as carbonates, basic carbonates, nitrates, sulfates, phosphates and halides) or with organic acids (e.g. carboxylates such as formates, acetates, oxalates, etc.).

Examples of the alkali metal compounds include compounds of Li, Na, K, Rb and Cs such as hydroxides, their inorganic salts exemplified by hydrogen carbonates, carbonates, nitrates, borates, silicates, sulfates, halides, etc., and their salts with organic acids, typified by formates, acetates, oxalates, citrates, tartrates, benzoates, phenolates, sulfonates, etc.

Examples of the alkaline earth metal compounds include compounds of Be, Mg, Ca, Sr and Ba, such as oxides and hydroxides, salts with inorganic acids, exemplified by carbonates, nitrates, sulfates, phosphates, halides, etc., and salts with organic acids, typified by formates, acetates, oxalates, etc.

The activated carbon containing metal compounds used in the present invention may contain both of the alkali metal compound and the alkaline earth metal compound.

The contents of the copper compound and the second metal compound in the activated carbon containing metal compounds are 0.1 mg atom to 3.0 mg atom as copper per g of activated carbon, preferably 0.2 mg atom to 2.0 mg atom, and 0.1 mg atom to 5.0 mg atom as alkali metal or as alkaline earth metal per g of activated carbon, preferably 0.2 mg atom to 4.0 mg atom, respectively. In case the activated carbon containing metal compound is one containing both of the alkali metal compound and the alkaline earth metal compound, the amount of one of the second metal compounds is 0.1 mg atom to 5.0 mg atom as metal per g of activated carbon, preferably 0.2 mg atom to 4.0 mg atom, and the amount of the other second metal compound is also 0.1 mg atom to 5.0 mg atom as metal per g of activated carbon, preferably 0.2 mg atom to 4.0 mg atom.

The activated carbon containing metal compounds may contain as a third component a compound of at least one kind of metal (hereinafter referred to as "third metal compound") selected from the group consisting of aluminum, titanium, vanadium, chromium, manganese, iron, cobalt, nickel, zinc, cadmium and lead, and the presence of the third metal compound highly improves the removal efficiency for sulfur compounds.

Examples of the third metal compounds include oxides, hydroxides, salts with inorganic acids, exemplified by carbonates, hydrogencarbonates, nitrates, borates, silicates, sulfates, phosphates, halides, etc., ammonium salts and salts with organic acids typified by formates, acetates, oxalates, citrates, etc.

In case the third metal compound is further incorporated into the activated carbon containing metal compounds, the content of the third metal compound in the activated carbon is 0.1 to 5.0 mg atom as metal per g of activated carbon, preferably 0.2 to 4.0 mg atom.

The activated carbon containing metal compound according to this invention is prepared for example by the following processes:

A. In case of the preparation of the activated carbon containing a copper compound and a second metal compound;
  (1) A process which comprises adding a copper compound and a second metal compound to a raw material for activated carbon and effecting carbonization and activation by a conventional method,
  (2) A process which comprises adding a copper compound to a raw material for activated carbon, effecting carbonization/activation by a conventional method, admixing the resultant activated carbon with a second metal compound, and drying or calcining the mixture, if necessary,
  (3) A process which comprises adding a second metal compound to a raw material for activated carbon, effecting carbonization/activation by a conventional method, admixing the resultant activated carbon with a copper compound, and drying or calcining the mixture, if necessary, (4) A process which comprises admixing activated carbon simultaneously with a copper compound and a second metal compound, and drying or calcining the mixture, if necessary, (5) A process which comprises admixing activated carbon with a copper compound, drying or calcining the mixture, and admixing with a second metal compound, followed by drying or calcining, if necessary, and (6) A process which comprises admixing activated carbon with a second metal compound, drying or calcining the mixture, and further admixing with a copper compound, followed by drying or calcining, if necessary.

B. In case of the preparation of the activated carbon containing both an alkali metal compound and an alkaline earth metal compound as the second metal compound;

(1) A process which comprises adding a copper compound, an alkaline earth metal compound and an alkali metal compound to a raw material for activated carbon, and effecting carbonization/activation by a conventional method, (2) A process which comprises adding a copper compound to raw material for activated carbon, effecting carbonization/activation by a conventional method, admixing the resultant activated carbon with an alkaline earth metal compound and an alkali metal compound, separately, and drying or calcining the mixture, if necessary, (3) A process which comprises adding an alkaline earth metal compound to a raw material for activated carbon, effecting carbonization/activation by a conventional method, admixing to the resultant activated carbon with a copper compound and an alkali metal compound, either simultaneously or separately, and drying or calcining the mixture, if necessary, (4) A process which comprises adding an alkali metal compound to a raw material for activated carbon, effecting carbonization/activation by a conventional method, admixing the resultant activated carbon with a copper compound and an alkaline earth metal compound, either simultaneously or separately, and drying or calcining the mixture, if necessary, (5) A process which comprises admixing activated carbon with a copper compound, an alkaline earth metal compound and an alkali metal compound simultaneously, and drying or calcining the mixture, if necessary, (6) A process which comprises admixing activated carbon with a copper compound, drying or calcining the mixture, admixing it further with an alkaline earth metal compound and an alkali metal compound, either simultaneously or separately, and drying or calcining the mixture, if necessary, (7) A process which comprises admixing activated carbon with an alkaline earth metal compound, drying or calcining the mixture, and admixing it further with a copper compound and an alkali metal compound, either simultaneously or separately, followed by drying or calcining, if necessary, and (8) A process which comprises admixing activated carbon with an alkali metal compound, drying or calcining the mixture, and admixing it further with a copper compound and an alkaline earth metal compound, either simultaneously or separately, followed by drying or calcining, if necessary.

C. In case of the preparation of the activated carbon containing a copper compound, a second metal compound and a third metal compound;

(1) A process which comprises adding a copper compound, a second metal compound and a third metal compound to a raw material for activated carbon, and effecting carbonization/activation by a conventional method, (2) A process which comprises adding a copper compound to a raw material for activated carbon, effecting carbonization/activation by a conventional method, admixing the resultant activated carbon with a second metal compound and a third metal compound, separately, and drying or calcining the mixture, if necessary, (3) A process which comprises adding a second metal compound to a raw material for activated carbon, effecting carbonization/activation by a conventional method, admixing the resultant activated carbon with a copper compound and a third metal compound, either simultaneously or separately, and drying or calcining the mixture, if necessary, (4) A process which comprises adding a third metal compound to a raw material for activated carbon, effecting carbonization/activation by a conventional method, admixing the resultant activated carbon with a copper compound and a second metal compound, either simultaneously or separately, and drying or calcining the mixture, if necessary, (5) A process which comprises admixing activated carbon with a copper compound, a second metal compound and a third metal compound simultaneously, and drying or calcining the mixture, if necessary, (6) A process which comprises admixing activated carbon with a copper compound, drying or calcining the mixture, admixing it further with a second metal compound and a third metal compound, either simultaneously or separately, and drying or calcining the mixture, if necessary, (7) A process which comprises admixing activated carbon with a second metal compound, drying or calcining the mixture, and admixing it further with a copper compound and a third metal compound, either simultaneously or separately, followed by drying or calcining, if necessary, and (8) A process which comprises admixing activated carbon with a third metal compound, drying or calcining the mixture, and admixing it further with a copper compound and a second metal compound, either simultaneously or separately, followed by drying or calcining, if necessary.

In these preparation processes, the procedure of admixing activated carbon with metal compounds is considered to involve impregnating or spraying activated carbon with a solution or suspension of metal compounds in water (inclusive of aqueous acid or alkali solution) or a variety of solvents.

In the above preparation processes, by "drying" is understood a step which comprises evaporating the water or solvent in the admixed activated carbon at a temperature of not higher than about 130° C., and the term "calcining" denotes a step which comprises heating the admixed activated carbon thus dried under an atmosphere of a gas such as an inert gas, carbon dioxide gas, steam and waste combustion gas at a temperature of not lower than about 130° C. to thermally decompose part or all of the metal compounds.

In the above processes, when activated carbon is admixed with compounds other than oxides of the copper, second metal compounds (except alkali metal compounds) and third metal compounds, it is favorable to effect heat treatment such as drying or calcining after the admixing; in cases in which activated carbon is admixed with a copper compound, a second metal compound (except alkali metal compound) and a third metal compound but is not subjected to heat treatment, it is preferred to use oxides of the copper, second metal (except alkali metal) and third metal compounds; when activated carbon is admixed with alkali metal compounds other than hydroxides, carbonates and hydrogen carbonates of alkali metal as the second metal compound, it is advantageous to effect heat treatment such as drying or calcining after the admixing; and in cases in which activated carbon is admixed with alkali metal compounds without subsequent heat treatment, it is favorable to use hydroxides, carbonates or hydrogencarbonates as the alkali metal compound.

The gas not substantially containing oxygen which is useful in this invention includes those having an oxygen concentration of not more than 2 vol.%. These gases may be exemplified by carbon dioxide gas, coke furnace gas, blast furnace gas, converter gas, thermal cracking gas of petroleum fractions, natural gas, etc.

The process of this invention is conducted by contacting the activated carbon containing metal compounds as obtained by the above procedure with a gas containing sulfur compounds. The solid-gas contacting method is by a known means such as the fixed bed, moving bed and fluidized bed, whereby the contacting temperature is not higher than 150° C., preferably 0° to 150° C., and the gas pressure is not higher than 50 kg/cm$^2$, preferably 0.1 to 40 kg/cm$^2$, with the gas contacting time being 1/10 to 100 seconds as measured at 25° C. and 1 kg/cm$^2$, preferably 1/5 to 80 seconds.

The examples described below illustrate this invention more specifically.

EXAMPLE 1

An activated carbon A of 16 to 24 mesh having a B.E.T. specific surface area of 1040 m$^2$/g was sprayed uniformly with a solution of a certain amount each of copper nitrate and nitrate of an alkali metal. 50 ml of the admixed product thus obtained was packed into a 4-cm diameter column made of quartz glass. The column was heated at a heating rate of 2° C./min. While allowing a nitrogen gas to flow therethrough at a linear flow rate of 10 cm/sec., the packed product was calcined at 350° C. for 30 minutes.

The contents of the copper and alkali-metal compounds in the catalyst thus obtained were 0.2 to 2.0 mg atom as copper and 0.2 to 2.0 mg atom as alkali metal per g of activated carbon, respectively.

As a control for reference, the activated carbon was admixed with copper nitrate solely or with nitrate of an alkali metal solely by the same procedure as mentioned above, and was calcined in a nitrogen gas at 350° C. for 30 minutes to prepare a catalyst.

15 ml each of the catalysts thus obtained was packed into a 1.6-cm diameter glass column. A gas of 40° C. containing 12.5 ppm of COS (N$_2$-97.5 vol.% and H$_2$O-2.5 vol.%) was allowed to pass through the column at a linear flow rate of 40 cm/sec. to conduct a break-through adsorption test on COS. The results are as shown in Table 1.

EXAMPLE 2

A 12 ml portion each of the catalysts A through M of Example 1 was packed into a 1.6 cm diameter glass column. A gas of 25° C. containing 10.0 ppm of H$_2$S (N$_2$-97.5 vol.% and H$_2$O-2.5 vol.%) was passed through the column at a linear flow rate of 40 cm/sec. to conduct a break-through adsorption test on H$_2$S. The results are as shown in Table 2.

EXAMPLE 3

A certain amount each of Li$_2$CO$_3$, Na$_2$SO$_4$, K$_2$SO$_4$, Rb$_2$SO$_4$, Cs$_2$SO$_4$, HCOONa, CH$_3$COOK and (COONa)$_2$ was incorporated into a coconut-shell raw material. After being mixed and crushed, the mixture was kneaded with various kinds of pitch, water, etc., and molded into cylindrical pellets of 4 mm diameter. The pellets were carbonized at 650° C. and further steam-activated at 900° C. The resultant activated carbon showed a B.E.T. specific surface area of 1000 to 1100 m$^2$/g and a content of the alkali metal compound of 0.8 to 1.1 mg atom as metal per g of activated carbon, as shown in Table 3.

Various kinds of the activated carbon were crushed and sieved to a uniform grain size of 16 to 24 mesh and each was sprayed with a solution of a certain amount of copper sulfate in water. 50 ml each of the admixed products thus obtained was packed into a 4 cm diameter column made of quartz glass. The column was heated at a heating rate of 2° C./min., while a nitrogen gas was allowed to pass through it at a linear flow rate of 10 cm/sec., and the packed product was calcined at 350° C. for 30 minutes. The contents of the copper compound in the resultant catalysts were 1.0 mg atom as metal per g of activated carbon.

15 ml each of the catalysts N through U thus obtained was packed into a 1.6-cm diameter glass column, and a gas of 40° C. containing 12.5 ppm of COS (N$_2$-97.5 vol.% and H$_2$O-2.5 vol.%) was passed through the column at a linear flow rate of 40 cm/sec. to conduct a break-through adsorption test on COS. The results are as shown in Table 3.

EXAMPLE 4

A certain amount each of CuO, CuSO$_4$, (CH$_3$COO)$_2$Cu, (HCOO)$_2$Cu and CuCl$_2$ was incorporated into a coconut-shell raw material. After being mixed and crushed, the mixture was kneaded with various kinds of pitch, water, etc., and molded into cylindrical pellets of 4-mm diameter. The pellets were carbonized at 650° C. and further steam-activated at 900° C. The resultant activated carbon showed a B.E.T. specific surface area of 1000 to 1100 m$^2$/g and a content of the copper compound of 0.8 to 1.1 mg atom as metal per g of activated carbon.

Various kinds of the activated carbon were crushed and sieved to a uniform grain size of 16 to 24 mesh and each was sprayed with a solution of a certain of an alkali metal compound in water. 50 ml each of the admixed products thus obtained was packed into a 4-cm diameter column made of quartz glass. The column was heated at a heating rate of 2° C./min., while a nitrogen gas was allowed to pass through it at a linear flow rate of 10 cm/sec, and the packed material was burnt at 300° C. for 30 minutes. The contents of the alkali metal compounds in the resultant catalysts were 1.0 mg atom as metal per g of activated carbon.

15 ml each of the catalysts V through Z thus obtained was packed into a 1.6 cm diameter glass column, and a gas of 40° C. containing 12.5 ppm of COS ($N_2$-97.5 vol.% and $H_2O$-2.5 vol.%) was passed through the column at a linear flow rate of 40 cm/sec. to conduct a break-through adsorption test on COS. The results are as shown in Table 4.

umn, and a gas containing 12.5 ppm of COS (CO-97.5 vol.% and $H_2O$-2.5 vol %) was passed through the column at temperatures of 25°, 60°, 80° and 120° C. (in all cases, the linear flow rate of the gas was maintained at 40 cm/sec. as converted to 25° C.).

The COS concentrations in the gases withdrawn at the inlet and outlet of the column were measured by means of FPD gas chromatography, and the COS removal ratios were determined. The results are as shown in Table 5.

TABLE 1

| Catalyst | Amount of copper (mg-atom/g) | Kind and amount of alkali metal (mg-atom/g) | Percent removal of COS at the time points shown below (%) | | | | |
|---|---|---|---|---|---|---|---|
| | | | 15 hrs. later | 25 hrs. later | 50 hrs. later | 75 hrs. later | 100 hrs. later |
| A (control) | 0 | 0 | 0 | 0 | 0 | 0 | 0 |
| B (control) | 2.00 | 0 | 98 | 68 | 8 | 0 | 0 |
| C (control) | 0 | K-2.0 | 100 | 50 | 0 | 0 | 0 |
| D (present invention) | 0.2 | K-1.0 | 100 | 100 | 18 | 8 | 1 |
| E (present invention) | 0.5 | K-1.0 | 100 | 100 | 49 | 10 | 3 |
| F (present invention) | 1.0 | K-1.0 | 100 | 100 | 100 | 97 | 82 |
| G (present invention) | 2.0 | K-1.0 | 100 | 100 | 100 | 99 | 90 |
| H (present invention) | 1.0 | K-0.2 | 100 | 100 | 92 | 68 | 36 |
| I (present invention) | 1.0 | K-0.5 | 100 | 100 | 100 | 90 | 73 |
| J (present invention) | 1.0 | Li-0.5 | 100 | 100 | 85 | 63 | 54 |
| K (present invention) | 1.0 | Na-0.5 | 100 | 100 | 94 | 78 | 45 |
| L (present invention) | 1.0 | Rb-0.5 | 100 | 100 | 100 | 90 | 79 |
| M (present invention) | 1.0 | Cs-0.5 | 100 | 100 | 100 | 85 | 70 |

EXAMPLE 5

A 15 ml portion each of the catalysts F and I of Example 1 was packed into a 1.6 cm diameter glass col-

TABLE 2

| Catalyst | Amount of copper (mg-atom/g) | Kind and amount of alkali metal (mg-atom/g) | Percent removal of $H_2S$ at the time points shown below (%) | | | | |
|---|---|---|---|---|---|---|---|
| | | | 50 hrs. later | 100 hrs. later | 150 hrs. later | 200 hrs. later | 250 hrs. later |
| A (control) | 0 | 0 | 0 | 0 | 0 | 0 | 0 |
| B (control) | 2.0 | 0 | 100 | 77 | 38 | 9 | 0 |
| C (control) | 0 | K-2.0 | 100 | 58 | 5 | 0 | 0 |
| D (present invention) | 0.2 | K-1.0 | 100 | 100 | 83 | 64 | 42 |
| E (present invention) | 0.5 | K-1.0 | 100 | 100 | 100 | 93 | 81 |
| F (present invention) | 1.0 | K-1.0 | 100 | 100 | 100 | 97 | 92 |
| G (present invention) | 2.0 | K-1.0 | 100 | 100 | 100 | 98 | 95 |
| H (present invention) | 1.0 | K-0.2 | 100 | 100 | 99 | 92 | 79 |
| I (present invention | 1.0 | K-0.5 | 100 | 100 | 100 | 95 | 90 |
| J (present invention) | 1.0 | Li-0.5 | 100 | 100 | 90 | 83 | 69 |
| K (present invention) | 1.0 | Na-0.5 | 100 | 100 | 95 | 88 | 75 |
| L (present invention) | 1.0 | Rb-0.5 | 100 | 100 | 100 | 93 | 89 |
| M (present invention) | 1.0 | Cs-0.5 | 100 | 100 | 100 | 89 | 80 |

TABLE 3

| Catalyst | BET specific surface area (m²/g) | Kind of alkali metal salt and amount of alkali metal (mg-atom/g) | Amount of copper (mg-atom/g) | Percent removal of COS at the time points shown below (%) | | | |
|---|---|---|---|---|---|---|---|
| | | | | 10 hrs. later | 25 hrs. later | 50 hrs. later | 100 hrs. later |
| N | 1050 | $Li_2CO_3$-0.85 | 1.0 | 100 | 100 | 78 | 65 |
| O | 1100 | $Na_2CO_3$-0.98 | 1.0 | 100 | 100 | 80 | 68 |
| P | 1010 | $K_2SO_4$-0.94 | 1.0 | 100 | 100 | 95 | 79 |
| Q | 1090 | $Rb_2SO_4$-1.05 | 1.0 | 100 | 100 | 93 | 84 |
| R | 1050 | $Cs_2SO_4$-1.00 | 1.0 | 100 | 100 | 89 | 70 |
| S | 1100 | HCOONa-0.93 | 1.0 | 100 | 100 | 78 | 63 |
| T | 1080 | $CH_3$COOK-0.89 | 1.0 | 100 | 100 | 93 | 84 |
| U | 1020 | $(COONa)_2$-1.03 | 1.0 | 100 | 100 | 75 | 60 |

TABLE 4

| Catalyst | BET specific surface area (m²/g) | Kind of copper compound and amount of copper (mg-atom/g) | Kind of alkali metal salt and amount of alkali metal (mg-atom/g) | Percent removal of COS at a time point shown below (%) | | | |
|---|---|---|---|---|---|---|---|
| | | | | 10 hrs. later | 25 hrs. later | 50 hrs. later | 100 hrs. later |
| V | 1050 | CuO-0.95 | $LiNO_3$-1.0 | 100 | 100 | 83 | 72 |
| W | 1010 | $CuSO_4$-1.10 | $NaNO_3$-1.0 | 100 | 100 | 90 | 81 |
| X | 1070 | $(CH_3COO)_2Cu$-0.91 | $KNO_3$-1.0 | 100 | 100 | 98 | 83 |
| Y | 1100 | $(HCOO)_2Cu$-1.00 | $RbNO_3$-1.0 | 100 | 100 | 90 | 75 |
| Z | 1050 | $CuCl_2$-0.88 | $CsNO_3$-1.0 | 100 | 100 | 85 | 71 |

TABLE 5

| Contacting temperature (°C.) | Catalyst | Percent removal of COS at the time point shown below (%) | | | |
|---|---|---|---|---|---|
| | | 10 hrs. later | 25 hrs. later | 50 hrs. later | 100 hrs. later |
| 25 | F | 100 | 100 | 95 | 88 |
| | I | 100 | 100 | 84 | 80 |
| 60 | F | 100 | 100 | 100 | 95 |
| | I | 100 | 100 | 100 | 89 |
| 80 | F | 100 | 100 | 100 | 98 |
| | I | 100 | 100 | 100 | 88 |
| 120 | F | 100 | 100 | 100 | 98 |
| | I | 100 | 100 | 100 | 75 |

EXAMPLE 6

The activated carbon A of 16 to 24 mesh having a B.E.T. surface area of 1040 m²/g was sprayed uniformly with a solution in water of the two conponents (i.e. copper nitrate and nitrate of an alkaline earth metal), or the three components (i.e., copper nitrate, an alkaline earth metal compound and a third metal compound or alkali metal compound (nitrate)), 50 ml of the resultant admixed product was packed into a 4 cm diameter column made of quartz glass. The column was heated at a heating rate of 5° C./min., while a nitrogen gas was allowed to pass through it at a linear flow rate of 10 cm/sec., and the packed product was calcined at 300° C. for 30 minutes.

The contents of the copper compound, alkaline earth metal compound, alkali metal and third metal compound in the catalysts thus obtained were all 0.2 to 2.0 mg atom as metal per 1 g of activated carbon, as shown in Table 6.

As the control the activated carbon was admixed with copper nitrate, nitrate of an alkaline earth metal or a third metal compound alone, respectively, by the same procedure as mentioned above, and the admixed products were calcined in a nitrogen gas at 300° C. for 30 minutes to prepare the catalysts.

15 ml each of the catalysts a through j (controls) and 1 to 47 thus obtained was packed into a 1.6 cm diameter glass column, and a gas of 50° C. containing 12.5 ppm of COS ($N_2$-97.5 vol.%, $H_2O$-2.5 vol.%) was passed through it at a linear flow rate of 40 cm/sec to conduct a break-through adsorption test on COS. The results are as shown in Table 6.

EXAMPLE 7

A 12 ml portion each of the catalysts a through j (controls) and 1 through 47 of Example 6 was packed into a 1.6 cm diameter glass column, and a gas of 30° C. containing 10.0 ppm of $H_2S$ ($N_2$-97.5 vol.%, $H_2O$-2.5 vol.%) was passed through it at a linear flow rate of 40 cm/sec. to conduct a break-through adsorption test on $H_2S$. The results are as shown in Table 7.

EXAMPLE 8

A certain amount each of an alkaline earth metal compound and alkali metal compound or a third metal compound were added to a coconut-shell raw material. After being mixed and crushed, the mixture was kneaded with various kinds of pitch, water, etc., and molded into cylindrical pellets of 4 mm diameter. These pellets were carbonized at 650° C. and further steam-activated at 900° C. Various kinds of the resultant activated carbon showed a B.E.T. specific surface area of 950 to 1150 m²/g, with their contents of the alkaline earth metal and third metal compounds being all within the range of 0.8 to 1.1 mg atom per g of activated carbon, as shown in Table 8.

Various kinds of such activated carbon were crushed and sieved to a uniform grain size of 16 to 24 mesh and sprayed with a solution of a certain amount of copper acetate in 2% aqueous acetic acid. 50 ml of each of the admixed products thus obtained was packed into a 4 cm diameter column made of quartz glass. The column was heated at a heating rate of 5° C./min., while a nitrogen gas was allowed to pass through it at a linear flow rate of 10 cm/sec., and the packed product was calcined at 300° C. for 30 minutes. The content of the copper compound in the catalyst was 1.0 mg atom per g of activated carbon.

15 ml each of the catalysts, 48 through 76 thus obtained was packed into a 1.6 cm diameter glass column, and a gas of 50° C. containing 12.5 ppm of COS (CO-97.5 vol.% and H$_2$O-2.5 vol.%) was passed through it at a linear flow rate of 40 cm/sec. to conduct a breakthrough adsorption test on COS. The results are as shown in Table 8.

EXAMPLE 9

A 15 ml portion of each of the catalysts 3, 9, 13, 20, 30 and 37 of Example 6 was packed into a 1.6 cm diameter glass column, and a gas containing 12.5 ppm of COS (N$_2$-97.5 vol.% and H$_2$O-2.5 vol.%) was passed through it at 25°, 60°, 80° and 120° C., respectively (in every case, a gas linear flow rate was maintained at 40 cm/sec. as measured at 25° C.).

The COS concentrations at the outlet and inlet of the column were measured by means of FPD gas chromatography to determine the COS removal rates at certain points of time. The results are as shown in Table 9.

TABLE 6

| Catalyst | Amount of copper (mg-atom/g) | Kind and amount of alkaline earth metal (mg-atom/g) | Kind and amount of alkali metal or third metal (mg-atom/g) | Percent removal of COS at the time point shown below (%) | | | |
|---|---|---|---|---|---|---|---|
| | | | | 25 hrs. later | 50 hrs. later | 75 hrs. later | 100 hrs. later |
| control | | | | | | | |
| a | 0 | 0 | 0 | 0 | 0 | 0 | 0 |
| b | 200 | 0 | 0 | 90 | 18 | 0 | 0 |
| c | 0 | Mg-2.0 | 0 | 35 | 0 | 0 | 0 |
| d | 0 | 0 | K-2.0 | 73 | 0 | 0 | 0 |
| e | 0 | Mg-1.0 | K-2.0 | 78 | 0 | 0 | 0 |
| f | 0 | Mg-1.0 | Al-1.0 | 40 | 3 | 0 | 0 |
| g | 0 | Mg-1.0 | Cr-1.0 | 60 | 11 | 0 | 0 |
| h | 0 | Mg-1.0 | Fe-1.0 | 48 | 15 | 0 | 0 |
| i | 0 | Mg-1.0 | Zn-1.0 | 100 | 48 | 18 | 4 |
| j | 0 | Mg-1.0 | Cd-1.0 | 100 | 40 | 10 | 0 |
| present invention | | | | | | | |
| 1 | 0.2 | Mg-1.0 | 0 | 100 | 98 | 58 | 10 |
| 2 | 0.5 | Mg-1.0 | 0 | 100 | 100 | 88 | 23 |
| 3 | 1.0 | Mg-1.0 | 0 | 100 | 100 | 90 | 31 |
| 4 | 2.0 | Mg-1.0 | 0 | 100 | 100 | 95 | 45 |
| 5 | 1.0 | Mg-0.2 | 0 | 100 | 99 | 60 | 35 |
| 6 | 1.0 | Mg-0.5 | 0 | 100 | 100 | 75 | 55 |
| 7 | 1.0 | Be-1.0 | 0 | 100 | 100 | 70 | 30 |
| 8 | 1.0 | Ca-1.0 | 0 | 100 | 100 | 68 | 25 |
| 9 | 1.0 | Sr-1.0 | 0 | 100 | 100 | 88 | 32 |
| 10 | 1.0 | Ba-0.5 | 0 | 100 | 100 | 85 | 24 |
| 11 | 0.2 | Mg-0.5 | K-1.0 | 100 | 100 | 100 | 89 |
| 12 | 0.5 | Mg-0.5 | K-1.0 | 100 | 100 | 100 | 95 |
| 13 | 1.0 | Mg-0.5 | K-1.0 | 100 | 100 | 100 | 98 |
| 14 | 2.0 | Mg-0.5 | K-1.0 | 100 | 100 | 100 | 100 |
| 15 | 1.0 | Mg-0.5 | Li-0.2 | 100 | 100 | 100 | 99 |
| 16 | 1.0 | Mg-0.5 | Na-0.5 | 100 | 100 | 100 | 98 |
| 17 | 1.0 | Mg-0.5 | Rb-1.0 | 100 | 100 | 100 | 98 |
| 18 | 1.0 | Mg-0.2 | Cs-1.0 | 100 | 100 | 100 | 100 |
| 19 | 1.0 | Be-1.0 | Na-1.0 | 100 | 100 | 100 | 96 |
| 20 | 1.0 | Sr-0.5 | Na-1.0 | 100 | 100 | 100 | 99 |
| 21 | 1.0 | Ba-0.5 | Na-1.0 | 100 | 100 | 100 | 95 |
| 22 | 1.0 | Mg-1.0 | Pb-1.0 | 100 | 100 | 100 | 85 |
| 23 | 1.0 | Mg-1.0 | Ti-1.0 | 100 | 100 | 100 | 59 |
| 24 | 1.0 | Mg-0.5 | Al-0.5 | 100 | 100 | 99 | 60 |
| 25 | 1.0 | Mg-0.5 | Cr-0.5 | 100 | 100 | 100 | 75 |
| 26 | 1.0 | Mg-0.5 | Mn-0.5 | 100 | 100 | 94 | 70 |
| 27 | 1.0 | Mg-0.5 | Fe-0.5 | 100 | 100 | 90 | 75 |
| 28 | 1.0 | Mg-0.5 | Co-0.5 | 100 | 100 | 99 | 70 |
| 29 | 1.0 | Mg-0.5 | Ni-0.5 | 100 | 100 | 98 | 53 |
| 30 | 1.0 | Mg-0.5 | Zn-0.5 | 100 | 100 | 100 | 98 |
| 31 | 1.0 | Mg-0.5 | Cd-0.5 | 100 | 100 | 90 | 63 |
| 32 | 1.0 | Mg-0.5 | Pb-0.5 | 100 | 100 | 100 | 53 |
| 33 | 1.0 | Mg-0.5 | Ti-0.5 | 100 | 100 | 91 | 41 |
| 34 | 1.0 | Mg-0.5 | V-0.5 | 100 | 100 | 95 | 48 |
| 35 | 1.0 | Ca-0.5 | Al-0.5 | 100 | 100 | 98 | 70 |
| 36 | 1.0 | Ca-0.5 | Cr-0.5 | 100 | 100 | 100 | 64 |
| 37 | 1.0 | Ca-0.5 | Zn-0.5 | 100 | 100 | 100 | 92 |
| 38 | 1.0 | Ca-0.5 | Pb-0.5 | 100 | 100 | 100 | 70 |
| 39 | 1.0 | Ca-0.5 | Cd-0.5 | 100 | 100 | 100 | 75 |
| 40 | 1.0 | Be-0.5 | Al-0.5 | 100 | 100 | 81 | 38 |
| 41 | 1.0 | Be-0.5 | Cr-0.5 | 100 | 100 | 94 | 54 |
| 42 | 1.0 | Sr-0.5 | Zn-0.5 | 100 | 100 | 100 | 90 |
| 43 | 1.0 | Sr-0.5 | Cd-0.5 | 100 | 100 | 92 | 50 |
| 44 | 1.0 | Ba-0.5 | V-0.5 | 100 | 100 | 100 | 69 |
| 45 | 1.0 | Ba-0.5 | Ti-0.5 | 100 | 100 | 85 | 41 |
| 46 | 0.2 | Ca-1.0 | Al-0.5 | 100 | 100 | 88 | 40 |
| 47 | 0.5 | Ca-1.0 | Al-0.5 | 100 | 100 | 85 | 71 |

TABLE 7

| | Percent removal of H₂S at the time point shown below (%) | | | | |
|---|---|---|---|---|---|
| Catalyst | 50 hrs. later | 100 hrs. later | 150 hrs. later | 200 hrs. later | 250 hrs. later |
| control | | | | | |
| a | 0 | 0 | 0 | 0 | 0 |
| b | 100 | 79 | 39 | 13 | 0 |
| c | 95 | 32 | 0 | 0 | 0 |
| d | 100 | 58 | 5 | 0 | 0 |
| e | 100 | 69 | 15 | 0 | 0 |
| f | 100 | 30 | 0 | 0 | 0 |
| g | 100 | 45 | 11 | 0 | 0 |
| h | 100 | 25 | 0 | 0 | 0 |
| i | 100 | 64 | 14 | 0 | 0 |
| j | 100 | 48 | 6 | 0 | 0 |
| present invention | | | | | |
| 1 | 100 | 100 | 98 | 69 | 39 |
| 2 | 100 | 100 | 100 | 95 | 83 |
| 3 | 100 | 100 | 100 | 95 | 86 |
| 4 | 100 | 100 | 100 | 100 | 98 |
| 5 | 100 | 100 | 90 | 81 | 65 |
| 6 | 100 | 100 | 98 | 93 | 86 |
| 7 | 100 | 100 | 90 | 83 | 69 |
| 8 | 100 | 100 | 98 | 81 | 73 |
| 9 | 100 | 100 | 100 | 95 | 89 |
| 10 | 100 | 100 | 99 | 98 | 84 |
| 11 | 100 | 100 | 100 | 100 | 98 |
| 12 | 100 | 100 | 100 | 100 | 98 |
| 13 | 100 | 100 | 100 | 100 | 100 |
| 14 | 100 | 100 | 100 | 100 | 100 |
| 15 | 100 | 100 | 100 | 100 | 100 |
| 16 | 100 | 100 | 100 | 100 | 100 |
| 17 | 100 | 100 | 100 | 100 | 100 |
| 18 | 100 | 100 | 100 | 100 | 99 |
| 19 | 100 | 100 | 100 | 100 | 100 |
| 20 | 100 | 100 | 100 | 100 | 100 |
| 21 | 100 | 100 | 100 | 100 | 100 |
| 22 | 100 | 100 | 100 | 95 | 89 |
| 23 | 100 | 100 | 100 | 91 | 85 |
| 24 | 100 | 100 | 100 | 100 | 90 |
| 25 | 100 | 100 | 100 | 100 | 98 |
| 26 | 100 | 100 | 100 | 100 | 95 |
| 27 | 100 | 100 | 100 | 100 | 98 |
| 28 | 100 | 100 | 100 | 95 | 80 |
| 29 | 100 | 100 | 100 | 91 | 78 |
| 30 | 100 | 100 | 100 | 100 | 100 |
| 31 | 100 | 100 | 100 | 100 | 100 |
| 32 | 100 | 100 | 100 | 100 | 100 |
| 33 | 100 | 100 | 100 | 95 | 81 |
| 34 | 100 | 100 | 100 | 100 | 100 |
| 35 | 100 | 100 | 100 | 100 | 98 |
| 36 | 100 | 100 | 100 | 100 | 100 |
| 37 | 100 | 100 | 100 | 100 | 100 |
| 38 | 100 | 100 | 100 | 100 | 83 |
| 39 | 100 | 100 | 100 | 100 | 86 |
| 40 | 100 | 100 | 100 | 98 | 94 |
| 41 | 100 | 100 | 100 | 92 | 88 |
| 42 | 100 | 100 | 100 | 100 | 100 |
| 43 | 100 | 100 | 100 | 100 | 100 |
| 44 | 100 | 100 | 100 | 100 | 100 |
| 45 | 100 | 100 | 100 | 100 | 98 |
| 46 | 100 | 100 | 100 | 86 | 75 |
| 47 | 100 | 100 | 100 | 94 | 91 |

TABLE 8

| Catalyst | BET specific surface area (m²/g) | Kind of alkaline earth metal salt and amount alkaline earth metal (mg-atom/g) | Kind of third metal compound or alkali metal compound and amount of the metal (mg-atom/g) | Amount of copper compound (as metal) (mg-atom/g) | Percent removal of COS at the time point shown below (%) | | | |
|---|---|---|---|---|---|---|---|---|
| | | | | | 25 hrs. later | 50 hrs. later | 75 hrs. later | 100 hrs. later |
| 48 | 1100 | Be(NO₃)₂-1.0 | — | CuO-0.89 | 100 | 95 | 76 | 49 |
| 49 | 1060 | Mg(NO₃)₂-1.0 | — | CuSO₄-0.98 | 100 | 100 | 80 | 45 |
| 50 | 980 | Ca(NO₃)₂-1.0 | — | (CH₃COO)₂Cu-1.03 | 100 | 100 | 83 | 35 |
| 51 | 1000 | Sr(NO₃)₂-1.0 | — | (HCOO)₂Cu-0.94 | 100 | 100 | 86 | 51 |
| 52 | 970 | Ba(NO₃)₂-1.0 | — | CuCl₂-1.07 | 100 | 93 | 61 | 28 |
| 53 | 980 | BeCO₃-0.95 | — | (CH₃COO)₂Cu-1.0 | 100 | 93 | 58 | 25 |
| 54 | 1110 | MgO-0.83 | — | (CH₃COO)₂Cu-1.0 | 100 | 100 | 75 | 39 |
| 55 | 960 | CaO-0.91 | — | (CH₃COO)₂Cu-1.0 | 100 | 98 | 56 | 16 |
| 56 | 1050 | SrO-1.05 | — | (CH₃COO)₂Cu-1.0 | 100 | 100 | 90 | 63 |
| 57 | 1140 | Ba(OH)₂-0.98 | — | (CH₃COO)₂Cu-1.0 | 100 | 90 | 64 | 43 |
| 58 | 1000 | MgCl₂-1.09 | — | (CH₃COO)₂Cu-1.0 | 100 | 93 | 70 | 51 |
| 59 | 1060 | (CH₃COO)₂Mg-0.94 | — | (CH₃COO)₂Cu-1.0 | 100 | 99 | 85 | 67 |
| 60 | 990 | (HCOO)₂Ca-0.87 | — | (CH₃COO)₂Cu-1.0 | 100 | 98 | 71 | 43 |
| 61 | 1120 | BaCO₃-0.95 | Li₂CO₃-0.85 | (CH₃COO)₂Cu-1.0 | 100 | 100 | 91 | 25 |
| 62 | 1110 | SrCO₃-0.82 | Na₂SO₄-0.93 | (CH₃COO)₂Cu-1.0 | 100 | 100 | 90 | 42 |
| 63 | 980 | BeCO₃-0.99 | K₂SO₄-0.88 | (CH₃COO)₂Cu-1.0 | 100 | 100 | 95 | 53 |
| 64 | 980 | MgCO₃-0.92 | Rb₂SO₄-1.01 | (CH₃COO)₂Cu-1.0 | 100 | 100 | 100 | 65 |
| 65 | 960 | (CH₃COO)₂Sr-0.83 | Cs₂SO₄-1.00 | (CH₃COO)₂Cu-1.0 | 100 | 100 | 89 | 31 |
| 66 | 1100 | MgCO₃-0.92 | HCOONa-1.09 | (CH₃COO)₂Cu-1.0 | 100 | 100 | 96 | 45 |
| 67 | 1030 | (HCOO)₂Mg-1.04 | CH₃COOK-1.10 | (CH₃COO)₂Cu-1.0 | 100 | 100 | 100 | 79 |
| 68 | 1010 | CaCO₃-1.00 | (COONa)₂-0.90 | (CH₃COO)₂Cu-1.0 | 100 | 95 | 81 | 13 |
| 69 | 980 | BeCO₃-0.95 | Al(NO₃)₃-0.5 | (CH₃COO)₂Cu-1.0 | 100 | 98 | 85 | 49 |
| 70 | 1110 | MgO-0.83 | Cr(NO₃)₃-0.5 | (CH₃COO)₂Cu-1.0 | 100 | 100 | 87 | 58 |
| 71 | 960 | CaCO₃-0.91 | Mn(NO₃)₂-0.5 | (CH₃COO)₂Cu-1.0 | 100 | 100 | 93 | 60 |
| 72 | 1050 | SrO-1.05 | Fe(NO₃)₃-0.5 | (CH₃COO)₂Cu-1.0 | 100 | 100 | 91 | 75 |
| 73 | 1140 | Ba(OH)₂-0.98 | Co(NO₃)₂-0.5 | (CH₃COO)₂Cu-1.0 | 100 | 100 | 78 | 53 |
| 74 | 1000 | MgCl₂-1.09 | Ni(NO₃)₂-0.5 | (CH₃COO)₂Cu-1.0 | 100 | 99 | 73 | 61 |
| 75 | 1060 | (CH₃COO)₂Mg-0.94 | Zn(NO₃)₂-0.5 | (CH₃COO)₂Cu-1.0 | 100 | 100 | 100 | 100 |
| 76 | 990 | (HCOO)₂Ca-0.87 | VOSO₄-0.5 | (CH₃COO)₂Cu-1.0 | 100 | 100 | 95 | 88 |

TABLE 9

| Contacting Temperature (°C.) | Catalyst | Percent removal of COS at the time point shown below (%) | | | |
|---|---|---|---|---|---|
| | | 25 hrs. later | 50 hrs. later | 75 hrs. later | 100 hrs. later |
| 25 | 3 | 100 | 97 | 83 | 69 |
| | 9 | 100 | 94 | 80 | 65 |
| 60 | 3 | 100 | 100 | 100 | 64 |
| | 9 | 100 | 100 | 100 | 51 |

TABLE 9-continued

| Contacting Temperature (°C.) | Catalyst | Percent removal of COS at the time point shown below (%) | | | |
|---|---|---|---|---|---|
| | | 25 hrs. later | 50 hrs. later | 75 hrs. later | 100 hrs. later |
| 80 | 3 | 100 | 100 | 100 | 86 |
| | 9 | 100 | 100 | 100 | 73 |
| 120 | 3 | 100 | 100 | 100 | 52 |
| | 9 | 100 | 100 | 100 | 35 |
| 25 | 13 | 100 | 100 | 98 | 95 |
| | 20 | 100 | 100 | 97 | 92 |
| 60 | 13 | 100 | 100 | 100 | 100 |
| | 20 | 100 | 100 | 100 | 100 |
| 80 | 13 | 100 | 100 | 100 | 100 |
| | 20 | 100 | 100 | 100 | 100 |
| 120 | 13 | 100 | 100 | 100 | 75 |
| | 20 | 100 | 100 | 100 | 61 |
| 25 | 30 | 100 | 100 | 95 | 88 |
| | 37 | 100 | 100 | 100 | 95 |
| 60 | 30 | 100 | 100 | 100 | 69 |
| | 37 | 100 | 100 | 100 | 100 |
| 80 | 30 | 100 | 100 | 100 | 78 |
| | 37 | 100 | 100 | 100 | 100 |
| 120 | 30 | 100 | 100 | 100 | 51 |
| | 37 | 100 | 100 | 100 | 68 |

EXAMPLE 10

The activated carbon A of 16 to 24 mesh having a B.E.T. specific surface area of 1065 m²/g was sprayed evenly with a solution in water of a certain amount each of copper nitrate, nitrate of an alkali metal and nitrate of Al, Cr, Mn, Fe, Co, Ni, Zn, Cd or Pb, titanium sulfate or vanadium sulfate.

50 ml of the resultant admixed product was packed into a 4-cm diameter column made of quartz glass. The column was heated at a heating rate of 5° C./min while a nitrogen gas was allowed to pass through it at a linear flow rate of 10 cm/sec., and the packed product was calcined at 300° C. for 30 minutes.

The content each of the copper compound, alkali metal compound and the compounds of Al, Cr, Mn, Fe, Co, Ni, Zn, Cd, Pb, Ti and V in the catalysts thus obtained were 0.2 to 2.0 mg atom as metal per g of activated carbon, as shown in Table 10.

As the control the activated carbon was admixed by the same procedure as mentioned above with combinations of copper nitrate and nitrate of an alkali metal and a compound of Al, Cr, Mn, Fe, Co, Ni, Zn, Cd, Pb, Ti or V, and the admixed product was calcined in a nitrogen gas at 300° C. for 30 minutes. By this procedure, catalysts were prepared.

15 ml each of the catalysts Ⓔ through Ⓜ thus obtained was packed into a 1.6 cm diameter glass column, and a gas of 50° C. containing 12.5 ppm of COS ($N_2$-97.5 vol.% and $H_2O$-2.5 vol.%) was passed through it at a linear flow rate of 40 cm/sec to conduct a break-through adsorption test on COS. The results are as shown in Table 10.

EXAMPLE 11

A 12 ml portion each of the catalysts Ⓔ through Ⓜ of Example 10 was packed into a 1.6 cm diameter glass column, and a gas of 25° C. containing 10 ppm of $H_2S$ ($N_2$-97.5 vol.% and $H_2O$-2.5 vol.%) was passed through it at a linear flow rate of 40 cm/sec to conduct a break-through adsorption test on $H_2S$. The results are as shown in Table 11.

EXAMPLE 12

A certain amount of each of $Li_2CO_3$, $Na_2SO_4$, $K_2SO_4$, $Rb_2SO_4$, $Cs_2SO_4$, HCOONa, $CH_3$COOK and $(COONa)_2$ was added to a coconut-shell raw material. After being mixed and crushed, the mixture was kneaded with various kinds of pitch, water, etc., and molded into cylindrical pellets of 4 mm diameter. The pellets were carbonized at 650° C. and steam-activated at 900° C.

The activated carbon thus obtained all showed a B.E.T. specific surface area of 950 to 1150 m²/g and a content of an alkali metal compound of 0.4 to 0.6 mg atom as metal per g of activated carbon, as shown in Table 12.

Various kinds of the activated carbon were crushed and sieved to a uniform grain size of 16 to 24 mesh and each was sprayed with a solution in a 2% aqueous nitric acid of the determined amount each of copper nitrate and nitrate of Al, Cr, Mn, Fe, Co., Ni, Zn, Cd or Pb, titanium sulfate or vanadyl sulfate.

50 ml each of the admixed products thus obtained was packed into a 4-cm diameter column made of quartz glass. The column was heated at a heating rate of 5° C./min, while a nitrogen gas was allowed to pass through it at a linear flow rate of 10 cm/sec., and the packed product was calcined at 350° C. for 30 minutes. The content of the copper compound in the resultant catalysts was 1.0 mg atom as metal per g of activated carbon, while the contents of the compounds of Al, Cr, Mn, Fe, Co, Ni, Zn, Cd, Pb, Ti and V were 0.5 mg atom as metal per g of activated carbon.

15 ml each of the catalysts Ⓝ through Ⓤ thus obtained was packed into a 1.6 cm diameter glass column, and a gas of 40° C. containing 12.5 ppm of COS ($N_2$-97.5 vol.% and $H_2O$-2.5 vol.%) was passed through it to conduct a break-through adsorption test on COS. The results are as shown in Table 12.

EXAMPLE 13

A 15 ml portion each of the catalysts G₇ and H₃ of Example 10 was packed into a 1.6-cm diameter glass column, and a gas containing 12.5 ppm of COS ($N_2$-97.5 vol.% and $H_2O$-2.5 vol.%) was passed through the column at 25°, 60°, 80° and 120° C., respectively, to conduct break-through adsorption tests on COS, whereby the gas linear flow rate in every case was maintained at 40 cm/sec as measured at 25° C. The test results are as shown in Table 13.

TABLE 10

| Catalyst | Amount of copper (mg-atom/g) | Kind and amount of alkali metal (mg-atom/g) | Kind and amount of third metals (mg-atom/g) | Percent removal of COS at the time point shown below (%) | | | |
|---|---|---|---|---|---|---|---|
| | | | | 25 hrs. later | 50 hrs. later | 75 hrs. later | 100 hrs. later |
| E₁ (control) | 0 | Na-1.0 | Al-1.0 | 49 | 4 | 0 | 0 |
| E₂ (control) | 0 | Na-1.0 | Cr-1.0 | 68 | 15 | 0 | 0 |
| E₃ (control) | 0 | Na-1.0 | Fe-1.0 | 51 | 18 | 3 | 0 |
| E₄ (control) | 0 | Na-1.0 | Zn-1.0 | 100 | 60 | 26 | 11 |

TABLE 10-continued

| Catalyst | Amount of copper (mg-atom/g) | Kind and amount of alkali metal (mg-atom/g) | Kind and amount of third metals (mg-atom/g) | Percent removal of COS at the time point shown below (%) | | | |
|---|---|---|---|---|---|---|---|
| | | | | 25 hrs. later | 50 hrs. later | 75 hrs. later | 100 hrs. later |
| E$_5$ (control) | 0 | Na-1.0 | Cd-1.0 | 100 | 55 | 13 | 0 |
| F$_1$ (present invention) | 1.0 | Na-1.0 | Pb-1.0 | 100 | 100 | 100 | 77 |
| F$_2$ (present invention) | 1.0 | Na-1.0 | Ti-1.0 | 100 | 100 | 100 | 69 |
| G$_1$ (present invention) | 1.0 | Na-0.5 | Al-0.5 | 100 | 100 | 98 | 68 |
| G$_2$ (present invention) | 1.0 | Na-0.5 | Cr-0.5 | 100 | 100 | 100 | 73 |
| G$_3$ (present invention) | 1.0 | Na-0.5 | Mn-0.5 | 100 | 100 | 95 | 63 |
| G$_4$ (present invention) | 1.0 | Na-0.5 | Fe-0.5 | 100 | 100 | 95 | 79 |
| G$_5$ (present invention) | 1.0 | Na-0.5 | Co-0.5 | 100 | 100 | 98 | 53 |
| G$_6$ (present invention) | 1.0 | Na-0.5 | Ni-0.5 | 100 | 100 | 96 | 49 |
| G$_7$ (present invention) | 1.0 | Na-0.5 | Zn-0.5 | 100 | 100 | 100 | 70 |
| G$_8$ (present invention) | 1.0 | Na-0.5 | Cd-0.5 | 100 | 100 | 96 | 56 |
| G$_9$ (present invention) | 1.0 | Na-0.5 | Pb-0.5 | 100 | 100 | 100 | 60 |
| G$_{10}$ (present invention) | 1.0 | Na-0.5 | Ti-0.5 | 100 | 100 | 93 | 48 |
| G$_{11}$ (present invention) | 1.0 | Na-0.5 | V-0.5 | 100 | 100 | 98 | 58 |
| H$_1$ (present invention) | 1.0 | K-0.5 | Al-0.5 | 100 | 100 | 100 | 73 |
| H$_2$ (present invention) | 1.0 | K-0.5 | Cr-0.5 | 100 | 100 | 100 | 61 |
| H$_3$ (present invention) | 1.0 | K-0.5 | Zn-0.5 | 100 | 100 | 100 | 88 |
| H$_4$ (present invention) | 1.0 | K-0.5 | Pb-0.5 | 100 | 100 | 100 | 69 |
| H$_5$ (present invention) | 1.0 | K-0.5 | Cd-0.5 | 100 | 100 | 100 | 78 |
| I$_1$ (present invention) | 1.0 | Li-0.5 | Al-0.5 | 100 | 100 | 95 | 59 |
| I$_2$ (present invention) | 1.0 | Li-0.5 | Cr-0.5 | 100 | 100 | 98 | 63 |
| J$_1$ (present invention) | 1.0 | Rb-0.5 | Zn-0.5 | 100 | 100 | 100 | 89 |
| J$_2$ (present invention) | 1.0 | Rb-0.5 | Cd-0.5 | 100 | 100 | 97 | 54 |
| K$_1$ (present invention) | 1.0 | Cs-0.5 | V-0.5 | 100 | 100 | 100 | 78 |
| K$_2$ (present invention) | 1.0 | Cs-0.5 | Ti-0.5 | 100 | 100 | 94 | 53 |
| L (present invention) | 0.2 | K-1.0 | Al-0.5 | 100 | 100 | 90 | 40 |
| M (present invention) | 0.5 | K-1.0 | Al-0.5 | 100 | 100 | 95 | 77 |

TABLE 11

| Catalyst | Percent removal of H$_2$S at the time point shown below (%) | | | | |
|---|---|---|---|---|---|
| | 50 hrs. later | 100 hrs. later | 150 hrs. later | 200 hrs. later | 250 hrs. later |
| E$_1$ (control) | 100 | 48 | 12 | 0 | 0 |
| E$_2$ (control) | 100 | 69 | 18 | 0 | 0 |
| E$_3$ (control) | 100 | 54 | 4 | 0 | 0 |
| E$_4$ (control) | 100 | 72 | 24 | 0 | 0 |
| E$_5$ (control) | 100 | 60 | 13 | 0 | 0 |
| F$_1$ (present invention) | 100 | 100 | 100 | 98 | 90 |
| F$_2$ (present invention) | 100 | 100 | 100 | 95 | 90 |
| G$_1$ (present invention) | 100 | 100 | 100 | 99 | 94 |
| G$_2$ (present invention) | 100 | 100 | 100 | 100 | 92 |
| G$_3$ (present invention) | 100 | 100 | 100 | 100 | 90 |
| G$_4$ (present invention) | 100 | 100 | 100 | 100 | 94 |
| G$_5$ (present invention) | 100 | 100 | 100 | 98 | 85 |
| G$_6$ (present invention) | 100 | 100 | 100 | 98 | 89 |
| G$_7$ (present invention) | 100 | 100 | 100 | 100 | 91 |
| G$_8$ (present invention) | 100 | 100 | 100 | 100 | 100 |
| G$_9$ (present invention) | 100 | 100 | 100 | 100 | 100 |
| G$_{10}$ (present invention) | 100 | 100 | 100 | 98 | 91 |
| G$_{11}$ (present invention) | 100 | 100 | 100 | 100 | 100 |

TABLE 11-continued

| Catalyst | Percent removal of H₂S at the time point shown below (%) | | | | |
|---|---|---|---|---|---|
| | 50 hrs. later | 100 hrs. later | 150 hrs. later | 200 hrs. later | 250 hrs. later |
| Ⓗ₁ (present invention) | 100 | 100 | 100 | 100 | 95 |
| Ⓗ₂ (present invention) | 100 | 100 | 100 | 100 | 100 |
| Ⓗ₃ (present invention) | 100 | 100 | 100 | 100 | 100 |
| Ⓗ₄ (present invention) | 100 | 100 | 100 | 100 | 94 |
| Ⓗ₅ (present invention) | 100 | 100 | 100 | 100 | 96 |
| Ⓘ₁ (present invention) | 100 | 100 | 100 | 95 | 91 |
| Ⓘ₂ (present invention) | 100 | 100 | 100 | 98 | 92 |
| Ⓙ₁ (present invention) | 100 | 100 | 100 | 100 | 100 |
| Ⓙ₂ (present invention) | 100 | 100 | 100 | 100 | 100 |
| Ⓚ₁ (present invention) | 100 | 100 | 100 | 100 | 100 |
| Ⓚ₂ (present invention) | 100 | 100 | 100 | 99 | 96 |
| Ⓛ (present invention) | 100 | 100 | 100 | 92 | 85 |
| Ⓜ (present invention) | 100 | 100 | 100 | 93 | 90 |

TABLE 12

| Catalyst | B.E.T. specific surface area (m²/g) | Kind of alkali metal salt incorporated and amount of alkali metal (mg-atom/g) | Amount of copper (mg-atom/g) | Kind and amount of third metal | Percent removal of COS at the time point shown below (%) | | | |
|---|---|---|---|---|---|---|---|---|
| | | | | | 25 hrs. later | 50 hrs. later | 75 hrs. later | 100 hrs. later |
| Ⓝ | 1100 | Li₂CO₃-0.45 | 1.0 | Al-0.5 | 100 | 100 | 93 | 48 |
| Ⓞ | 1050 | Na₂SO₄-0.49 | 1.0 | Cr-0.5 | 100 | 100 | 98 | 65 |
| Ⓟ | 980 | K₂SO₄-0.48 | 1.0 | Mn-0.5 | 100 | 100 | 95 | 60 |
| Ⓠ | 1000 | Rb₂SO₄-0.51 | 1.0 | Fe-0.5 | 100 | 100 | 93 | 63 |
| Ⓡ | 1000 | Cs₂SO₄-0.55 | 1.0 | Co-0.5 | 100 | 100 | 100 | 68 |
| Ⓢ | 960 | HCOONa-0.46 | 1.0 | Ni-0.5 | 100 | 100 | 96 | 55 |
| Ⓣ | 1080 | CH₃COOK-0.50 | 1.0 | Zn-0.5 | 100 | 100 | 100 | 56 |
| Ⓤ | 1100 | (COONa)₂-0.52 | 1.0 | V-0.5 | 100 | 100 | 100 | 49 |

TABLE 13

| Contacting temperature (°C.) | Catalyst | Percent removal of COS at the time point shown below (%) | | | |
|---|---|---|---|---|---|
| | | 25 hrs. later | 50 hrs. later | 75 hrs. later | 100 hrs. later |
| 25 | Ⓖ₇ | 100 | 100 | 90 | 85 |
| | Ⓗ₃ | 100 | 100 | 100 | 92 |
| 60 | Ⓖ₇ | 100 | 100 | 100 | 58 |
| | Ⓗ₃ | 100 | 100 | 100 | 100 |
| 80 | Ⓖ₇ | 100 | 100 | 100 | 59 |
| | Ⓗ₃ | 100 | 100 | 100 | 100 |
| 120 | Ⓖ₇ | 100 | 100 | 100 | 46 |
| | Ⓗ₃ | 100 | 100 | 100 | 65 |

What is claimed is:

1. A process for treatment of a gas containing hydrogen sulfide and/or carbonyl sulfide but not substantially containing oxygen, which comprises contacting the gas with activated carbon containing (1) a copper compound and (2) an alkali metal compound and/or an alkaline earth metal compound, at a temperature of not higher than 150° C., whereby hydrogen sulfide and/or carbonyl sulfide are removed from the gas.

2. A process as claimed in claim 1, wherein the activated carbon contains the copper compound and the alkali metal compound.

3. A process as claimed in claim 1, wherein the activated carbon contains the copper compound and the alkaline earth metal compound.

4. A process as claimed in claim 1, wherein the activated carbon contains the copper compound, the alkali metal compound and the alkaline earth metal compound.

5. A process as claimed in claim 1, wherein the activated carbon contains the compound of at least one metal selected from the group consisting of Al, Ti, V, Cr, Mn, Fe, Co, Ni, Zn, Cd and Pd as a third component, together with the copper compound and the alkali metal compound and/or alkaline earth metal compound.

6. A process as claimed in claim 5, wherein the activated carbon contains the copper compound, the alkali metal compound and the compound of at least one metal selected from the group consisting of Al, Ti, V, Cr, Mn, Fe, Co, Ni, Zn, Cd and Pb.

7. A process as claimed in claim 5, wherein the activated carbon contains the copper compound, the alkaline earth metal compound and the compound of at least one metal selected from the group consisting of Al, Ti, V, Cr, Mn, Fe, Co, Ni, Zn, Cd and Pb.

8. A process as claimed in claim 1, wherein the gas not substantially containing oxygen has an oxygen concentration of not more than 2 vol %.

9. A process as claimed in claim 1, wherein the gas is contacted with the activated carbon at a temperature of 0° C. to 150° C.

10. A process as claimed in claim 1, wherein the gas is contacted with the activated carbon for 1/10 to 100 seconds.

* * * * *